US012359577B2

(12) United States Patent
Mei et al.

(10) Patent No.: US 12,359,577 B2
(45) Date of Patent: Jul. 15, 2025

(54) TURBOMACHINE SEALING SYSTEM AND TURBOMACHINE INCLUDING THE SEALING SYSTEM

(71) Applicant: Nuovo Pignone Tecnologie—S.r.l., Florence (IT)

(72) Inventors: Luciano Mei, Florence (IT); Marco Boncinelli, Florence (IT); Egidio Pucci, Florence (IT)

(73) Assignee: Nuovo Pignone Tecnologie—S.R.L, Florence (IT)

( * ) Notice: Subject to any disclaimer, the term of this patent is extended or adjusted under 35 U.S.C. 154(b) by 0 days.

(21) Appl. No.: 17/014,001

(22) Filed: Sep. 8, 2020

(65) Prior Publication Data

US 2020/0400030 A1    Dec. 24, 2020

Related U.S. Application Data

(63) Continuation of application No. PCT/EP2019/025068, filed on Mar. 12, 2019.

(51) Int. Cl.
  *F01D 9/02*    (2006.01)
  *F01D 11/00*    (2006.01)
  *F16J 15/08*    (2006.01)

(52) U.S. Cl.
  CPC ............ *F01D 9/023* (2013.01); *F01D 11/005* (2013.01); *F16J 15/0887* (2013.01); *F05D 2240/55* (2013.01)

(58) Field of Classification Search
  CPC .... F01D 9/023; F01D 11/005; F05D 2240/55; F16J 15/0887
  See application file for complete search history.

(56) References Cited

U.S. PATENT DOCUMENTS 5,118,120 A   6/1992 Drerup et al.
6,347,508 B1  2/2002 Smallwood et al.
(Continued)

FOREIGN PATENT DOCUMENTS

CN   102588006 A1   7/2012
EP     2532837 B1   1/2016
(Continued)

OTHER PUBLICATIONS

International Search Report of the International Searching Authority for PCT/EP2019/025068 with mailing date of May 23, 2019.

*Primary Examiner* — Sang K Kim
(74) *Attorney, Agent, or Firm* — Paul Frank + Collins P.C.

(57) ABSTRACT

A sealing system is described for effecting a seal of a gap (G1; G2) in a turbomachine (1) between a first structural member (21; 23) and a second structural member (31). The sealing system includes a sealing apparatus comprising a sealing member (47; 77) comprising a first edge portion (49; 79) and a second edge portion (51; 81). The two edge portions are parallel to one another and the first edge portion (49; 79) forms a pivoting connection to the first structural member (21; 23). The first structural member (21; 23) further comprises a seat (55; 85) rotatably housing the first edge portion (49; 79) of the sealing member (47; 77). The second edge portion (51; 81) comprises a curved contact surface (51.1; 81.1), in sealing contact with a contact surface (67; 97) of the second structural member (31). Further disclosed herein is a gas turbine engine (1) with a combustor liner (31) and a sealing arrangement to seal a gap (G1; G2) between the combustor liner (31) and the turbine nozzles of the first turbine stage.

20 Claims, 3 Drawing Sheets

(56) References Cited

U.S. PATENT DOCUMENTS

| | | | |
|---|---|---|---|
| 8,104,772 B2* | 1/2012 | Halling | F01D 11/005 |
| | | | 277/609 |
| 8,661,828 B2 | 3/2014 | Pieussergues et al. | |
| 10,502,079 B2* | 12/2019 | Guinn | F01D 11/005 |
| 10,830,069 B2* | 11/2020 | Morgan | F02C 3/04 |
| 2004/0031270 A1 | 2/2004 | Sileo et al. | |
| 2005/0095123 A1 | 5/2005 | Taillant et al. | |
| 2009/0169369 A1 | 7/2009 | Morgan et al. | |
| 2009/0169370 A1 | 7/2009 | Morgan et al. | |
| 2011/0014029 A1 | 1/2011 | Venkataraman et al. | |
| 2011/0140370 A1* | 6/2011 | Sutcu | F01D 11/005 |
| | | | 277/603 |
| 2012/0171022 A1 | 7/2012 | Hafner | |
| 2016/0076391 A1* | 3/2016 | Guinn | F02C 7/28 |
| | | | 277/591 |
| 2017/0089211 A1* | 3/2017 | Broomer | F16J 15/04 |
| 2018/0045064 A1 | 2/2018 | Guinn et al. | |
| 2020/0141254 A1* | 5/2020 | Sarawate | F01D 11/005 |

FOREIGN PATENT DOCUMENTS

| | | |
|---|---|---|
| EP | 2 995 802 A1 | 3/2016 |
| FR | 2937098 A1 | 4/2010 |
| FR | 2 991 387 A1 | 12/2013 |
| RU | 2503821 C2 | 1/2014 |
| RU | 2640974 C1 | 1/2018 |

* cited by examiner

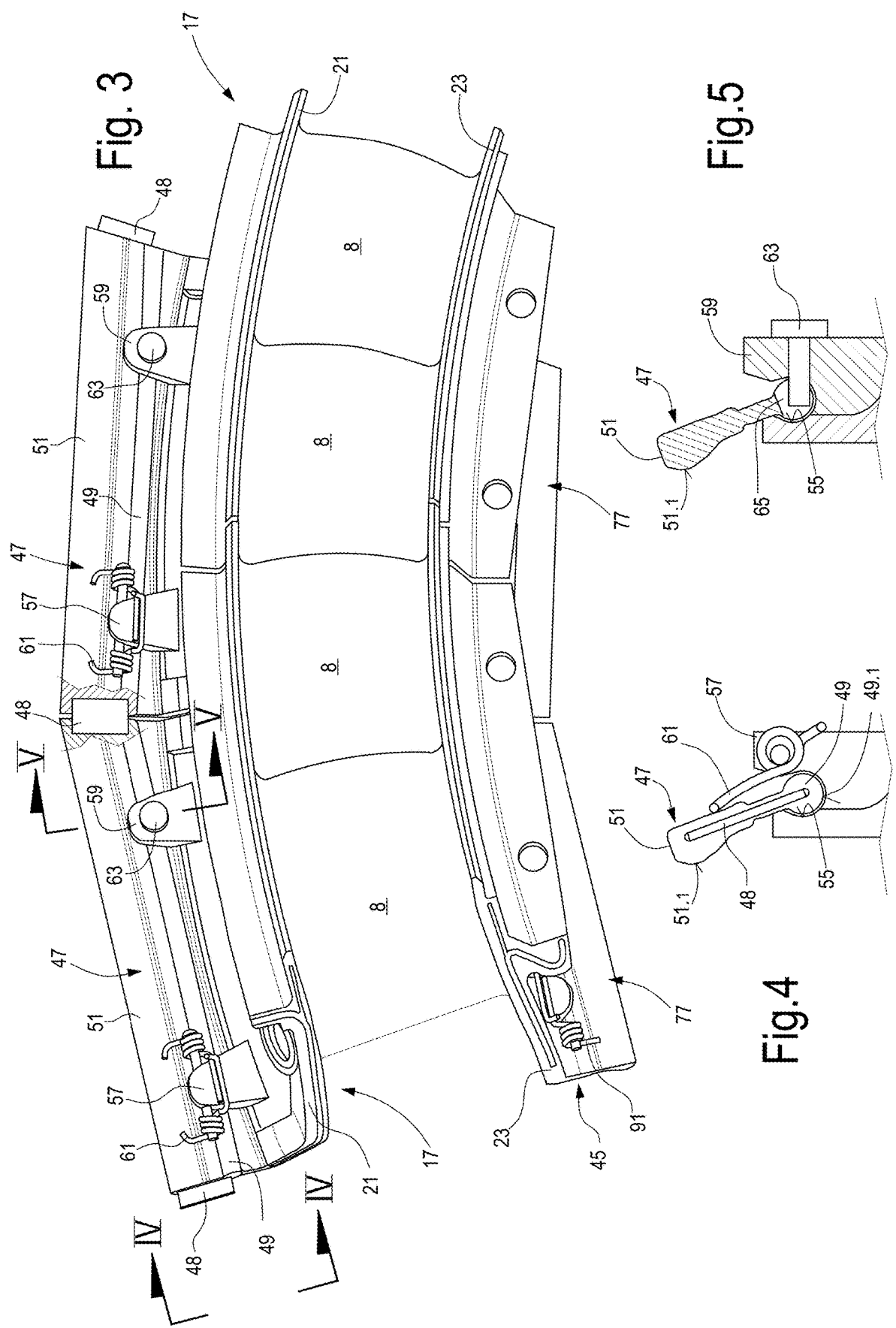

TURBOMACHINE SEALING SYSTEM AND TURBOMACHINE INCLUDING THE SEALING SYSTEM

CROSS-REFERENCE TO RELATED APPLICATIONS

This is a continuation of International Application PCT/EP2019/025068, with an international filing date of Mar. 12, 2019, filed by applicant, the disclosure of which is hereby incorporated by reference in its entirety.

TECHNICAL FIELD

The disclosure concerns apparatus, systems and structures for effecting a seal in a turbomachine. Embodiments disclosed herein specifically relate to sealing structures and apparatus for sealing a gap between first and second structural members. Some embodiments disclosed herein concern sealing structures to provide a sealing between a combustor liner and a surrounding structure in a gas turbine engine. The disclosure also relates to gas turbine engines including combustor liners and nozzles arranged at the aft side of the combustor, and further comprising a sealing structure for sealing a gap between the combustor liner and the nozzles.

BACKGROUND ART

In turbomachines, such as in particular, but not exclusively, gas turbines, a sealing structure for sealing a gap between a first structural member and a second structural member is often required. In several applications, the gap has an annular development, for instance extending around an axis of the turbomachine. The axis of the turbomachine can be the rotation axis of the compressor and turbine rotors of a gas turbine engine, for instance.

For example, sealing structures are required between a first structural member consisting of a combustor liner or part thereof, and a second structural member consisting of a surrounding structure, which may include inlet nozzles of the first turbine stage. During operation of the gas turbine engine, combustion gas generated in the combustor must be directed from the combustor through the inlet nozzles of the first turbine stage. Cooling air is caused to circulate around the combustor liner to cool the combustor liner. Combustion gas must be prevented from flowing through the gap between the combustor liner and the inlet nozzles of the first turbine stage. The gap between the combustor liner and the inlet nozzles of the first turbine engine, or any other surrounding structure arranged at the aft end of the combustor liner, must be efficiently sealed.

The combustor liner and the surrounding structure, e.g. the inlet nozzles of the first turbine stage, are subject to mutual displacements due to thermal expansions and contractions, as well as to vibrations. Efficient sealing thus requires the ability to allow sliding of the sealing elements with respect to the sealing surfaces they are in contact with, both in the axial as well as in the radial direction. As used herein, the axial direction can be understood as the direction parallel to the axis of the turbomachine, i.e. the rotation axis of the turbomachine rotor(s). As used herein, the radial direction is any direction orthogonal to the axial direction.

Among others, leaf seals have been developed to cope with the requirements of an axially and radially sliding sealing structure. U.S. Pat. No. 5,118,120 discloses a sealing structure comprised of a plurality of annularly arranged compliant leaf seals, which are biased by spring members in a sealing surface contact against an annular surface on the combustor liner and a sealing surface in the nozzle platforms. As the sealing leafs are resiliently compliant, they provide a sealing contact with both the combustor liner and the nozzle platform, under any operating condition of the gas turbine.

The above mentioned compliant leaf sealing arrangement proved to be efficient in effecting a seal of the gap between the aft end of the combustor liner and the first turbine stage inlet nozzles. However, under some operating conditions thermal deformations of the combustor liner and nozzle platform surfaces, against which the compliant leaf seals are biased, cause bending of the leaf seals and concentrated wearing of the leaf seals or of the surfaces in sealing contact therewith. Wearing reduces the in-service life of such components. Additionally, under certain operating conditions the resulting bending deformations of the compliant leaf seals could reduce the sealing efficiency.

Leaf seals are further sensitive to variations of relative displacements of the components involved, as well as variations of the static pressure drop and dynamic fluctuations. These latter can be generated by unstable combustion conditions, which often arise when lean fuel/air mixtures are used to reduce NOx emissions. This sensitiveness increases the risk of high-cycle fatigue failures, in particular during the phase of development of a new product, when the knowledge of several variables is necessarily low, as well as in off-design operating conditions.

A further drawback of leaf seals consists in the limited axial and radial displacements which they can allow. As a matter of fact, since large axial displacements would require leaf seals of remarkable dimensions, their use is limited to applications where the displacements are relatively small.

At least some of the drawbacks mentioned above may arise in connection with sealing arrangements in areas of a turbomachine other than the combustor liner.

It would therefore be beneficial to develop sealing structures, which are compliant with relevant relative displacements and able of providing longer in-service durability, while providing a similar or more efficient sealing, when compared with sealing structures of the current art.

SUMMARY

According to embodiments, disclosed herein is an apparatus for effecting a seal of a gap in a turbomachine between a first structural member and a second structural member. The apparatus includes a sealing member having a body comprising a first edge portion and a second edge portion, parallel to one another. The first edge portion forms a pivoting connection to the first structural member. The first structural member comprises a seat, for instance in the form of a slot, which rotatably houses the first edge portion of the sealing member. The second edge portion of the sealing member comprises a curved contact surface, in sealing contact with a contact surface of the second structural member. A resilient member can further be provided, which can be adapted to press the curved contact surface of the sealing member against the contact surface of the second structural member. A correct sealing contact will thus be provided even if the pressure differential between the inner and outer side of the sealing member is low.

In some embodiments, the edge portions can be rectilinear. According to other embodiments, one or both the edge portions may have a crowned shape. In some embodiments, the first edge portion, which forms the pivoting connection with the first structural member, may be only approximately cylindrical, in that the outer cylindrical surface thereof may be crowned. This may be beneficial for instance when the first structural member and the slot formed therein are subject to a non-homothetic thermal deformation.

In some embodiments, the apparatus comprises a plurality of sealing members in an annular arrangement, each sealing member being configured with first and second edge portions, as defined above.

In some embodiments, the first edge portion comprises a first approximately and possibly crowned cylindrical surface, preferably having a substantially circular cross-section and having an axis parallel to the second edge portion.

In some embodiments, the second edge portion comprises a second cylindrical surface having an axis parallel to the first edge portion.

Unless differently specified, the term "cylindrical surface" is used herein in its geometrical or kinematic meaning. Therefore, a cylindrical surface is a surface consisting of all the points on all the lines which are parallel to a given line and which pass through a fixed plane curve in a plane not parallel to the given line. From a kinematics point of view, given a curve in a plane, a cylindrical surface is that surface traced out by a line, not in the plane of the curve, moving parallel to itself and always passing through the curve.

According to another aspect, disclosed herein is a sealing structure for sealing a gap between a combustor liner and a surrounding structure of a gas turbine engine. The sealing structure includes a plurality of sealing members arranged in an annular configuration. Each sealing member comprises a body having a first edge portion and a second edge portion, parallel to one another. The first edge portion forms a pivoting connection to the surrounding structure. The surrounding structure comprises a seat rotatably housing the first edge portion of the sealing member. The second edge portion comprises a contact surface which is curved in a cross-sectional view, in sliding contact with a planar contact surface of the combustor liner. For each sealing member a respective resilient or elastic member is provided, adapted to press the curved contact surface of the sealing member against the contact surface of the combustor liner.

Further features and embodiments of the sealing arrangement of the present disclosure will be described later on, reference being made to the enclosed drawings, and are set forth in the appended claims, which form an integral part of the description.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 3 is a front view along line III-III of FIG. 2;
FIG. 4 is a side view along line IV-IV of FIG. 3;
and
FIG. 5 is a sectional view along line V-V of FIG. 3.

DETAILED DESCRIPTION OF EMBODIMENTS

In a gas turbine engine, air is compressed by a compressor section and delivered to a combustor. In the combustor, compressed air is mixed with fuel and the air/fuel mixture is ignited to generate hot and pressurized combustion gas. The combustion gas flows through a set of first inlet nozzles of a first turbine stage and caused to expand in one or more turbine stages, to generate mechanical power. The combustor comprises a combustor liner, which bounds the volume, in which the air/fuel mixture burns and develops in combustion gas. Some gas turbine engines are provided with an annular combustor liner, which extends around the rotation axis of the gas turbine engine. A gap is provided between the aft end of the combustor liner and the inlet nozzles of the first gas turbine stage. The aft end of the combustor liner is the end oriented towards the turbine stage(s), i.e. the end of the combustor, through which the combustion gas is delivered to the turbine stage(s).

Embodiments of the present disclosure refer to a seal apparatus or structure for sealing the gap between the combustor liner and the first inlet nozzles. To reduce wear and risk of high-cycle fatigue (HCF) failure modes and to provide efficient sealing under variable operating conditions of the turbine, a set of sealing members are annularly arranged on the a first static structural member, for instance on the first inlet nozzles or on a structure supporting these latter. Each sealing member has a first edge portion, which forms a pivoting hinge connection to the first structural member, such that the sealing member can rotate around a respective pivoting axis. Each sealing member has a second edge portion, parallel to the first edge portion and forming a contacting sealing surface, adapted to be in sealing surface contact with an annular surface of the aft end of the combustor liner. Each sealing member is resiliently biased against the combustor liner, such that the sealing contact is maintained in any operating conditions, even under reduced pressure difference between the inner volume of the combustor liner and the exterior of the combustor liner. The sealing members rigidly pivot around the respective pivoting axes, thus maintaining a straight line of sealing contact between the second edge portion of the sealing member and the combustor liner. Axial and radial displacements of the combustor liner with respect to the structure on which the sealing members are mounted result in sliding or rolling contact motion of the sealing members on the annular surface of the combustor liner.

Figure 1:
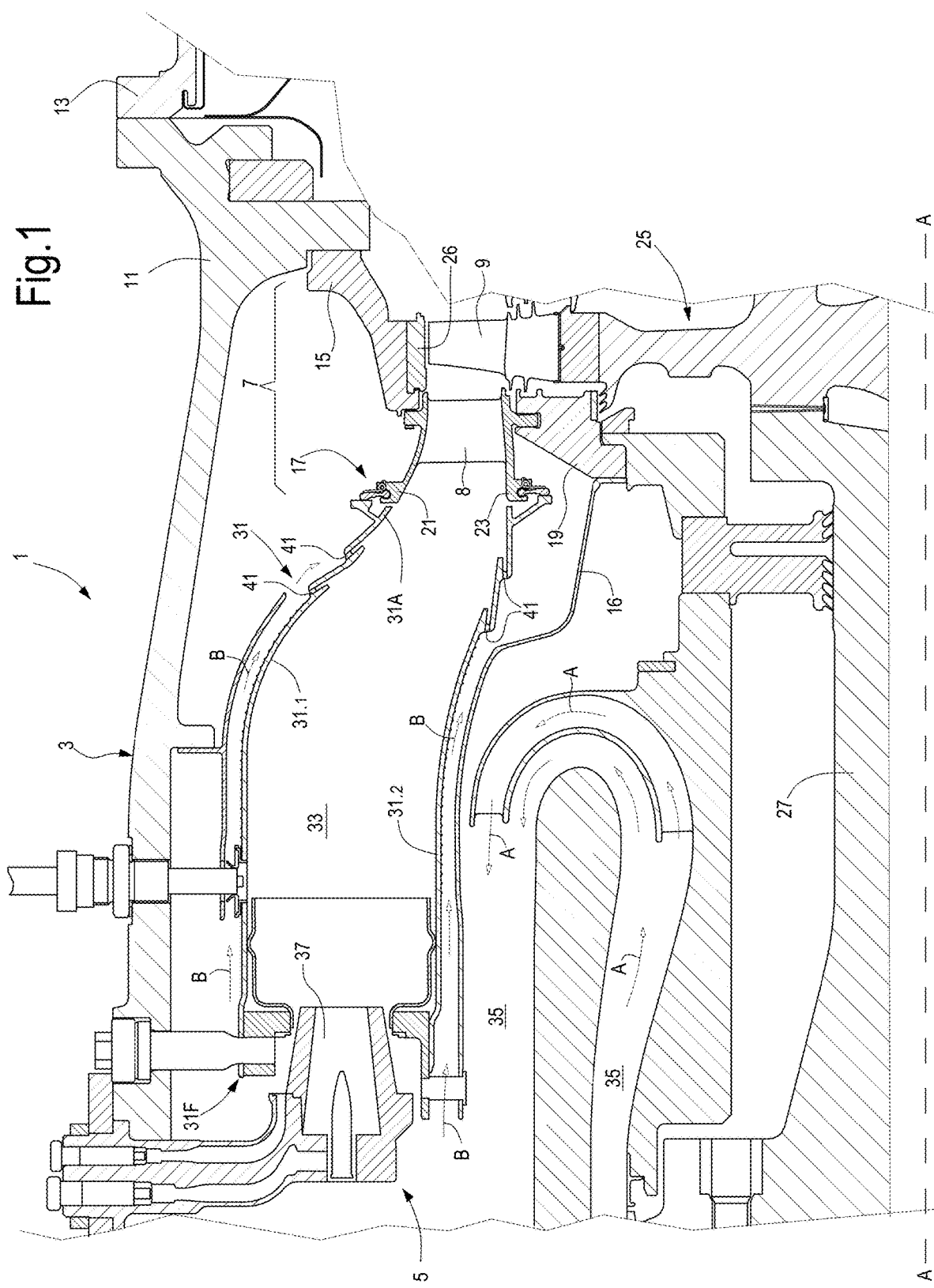
FIG. 1 is a schematic fragmental sectional view of a portion of a turbomachine along a plane containing the rotation axis of the turbomachine, illustrating locations in which the sealing apparatus of the present disclosure can be utilized.

Turning now to the drawings, FIG. 1 shows a fragmentary sectional view of a gas turbine engine 1, for the purpose of illustrating one environment in which the sealing apparatus and structure of the present disclosure can be employed.

For the purpose of the present discussion, the gas turbine engine 1 includes a casing 3, a combustor 5 stationary arranged in the casing 3 and a high pressure turbine 7. The high pressure turbine 7 can include any number of stages. Each stage includes an annular row of static turbine nozzles 8 and an annular row of rotary turbine blades 9, alternately disposed, as known in the art. In FIG. 1 only the first stage of the high pressure turbine 7 is shown, and the relevant first annular row of turbine nozzles 8. Additional intermediate pressure and/or low pressure turbine stages (not shown) can be arranged downstream of the first high-pressure turbine stage.

On the radially outer side the support structure for the high pressure turbine 7 includes an outer combustor casing 11, a turbine casing 13 and an outer turbine ring 15, which are fastened together. On the radially inner side, there is an inner combustor casing 16 secured to an inner turbine ring 19. A plurality of nozzle segments 17 are mounted on the inner turbine ring 19. Each nozzle segment 17, see also FIG. 3, comprises a plurality of turbine nozzles 8 arranged between an outer platform 21 and an inner platform 23. The set of nozzle segments 17 and the inner turbine ring 19 form a first structural member arranged at the aft end side of the combustor 5.

The turbine blades 9 are mounted on a turbine disk 25 mounted on a turbine shaft 27 for co-rotation therewith around a rotation axis A-A. A shroud 26 is mounted on the outer turbine ring 15 and extends around the turbine blades 9.

In the embodiment of FIG. 1, the combustor 5 is an annular combustor. The inner combustor casing 16 and the outer combustor casing 11 extend annularly around the rotation axis A-A. The combustor 5 comprises a combustor liner 31 arranged between the inner combustor casing 16 and the outer combustor casing 11. The combustor liner 31 comprises an outer combustor liner portion 31.1 and an inner combustor liner portion 31.2. The inner combustor liner portion 31.1 and the outer combustor liner portion 31.2 form an annular combustion chamber 33 therebetween. An air flow passage 35 is provided for conveying compressed air from the air compressor (not shown) of the gas turbine engine 1 towards the combustion chamber 33. The air flow is pictorially represented by arrows A.

The combustor 5 further comprises a plurality of fuel nozzles 37, through which gaseous or sprayed liquid fuel is delivered in the interior of the combustion chamber 33, where air and fuel are mixed to form an air/fuel mixture, which is ignited to generate combustion gas. The combustion gas is directed through the turbine nozzles 8 and through the turbine blades 9, where the combustion gas is expanded and generates mechanical power, which is made available on the turbine shaft 27.

An air flow is usually also conveyed around the outer walls of the combustor liner 31, as pictorially represented by arrows B, for cooling purposes. A portion of the cooling air passes through holes 41 in the combustor liner 31 to cool the inner walls thereof, creating an area of relatively low pressure, while most of the air flows downstream to cool the turbine nozzles and shroud 26.

Figure 2:
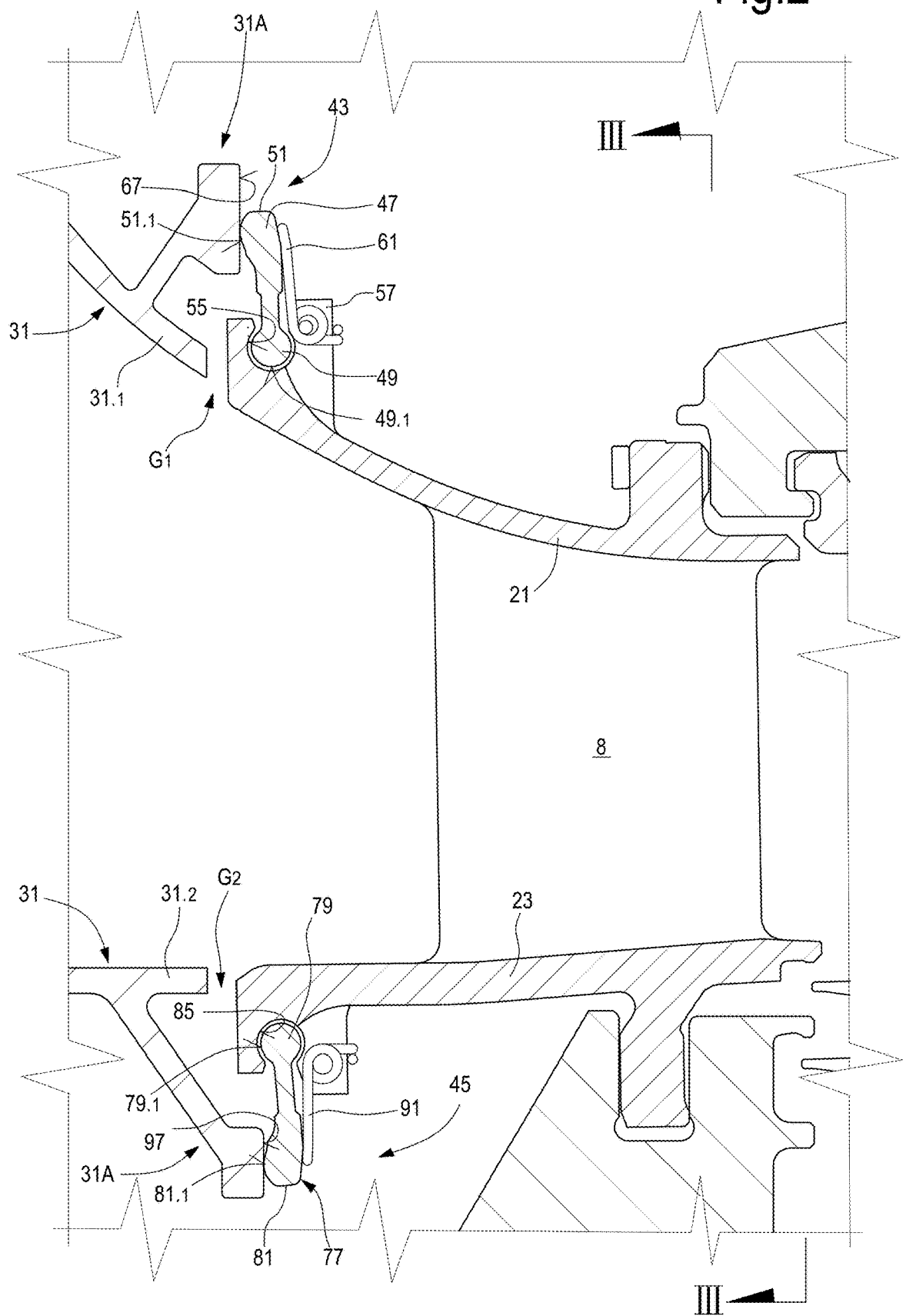
FIG. 2 is an enlargement of a detail of FIG. 1.

The combustor liner 31 extends from a forward end 31F to an aft end 31A, arranged in front of the turbine nozzles 8. A gap is provided between the aft end 31A of the combustor liner 31 and the first structural member including turbine nozzles 8. More specifically, a respective annular gap is provided between each combustor liner portion 31.1, 31.2 and the structural member which includes the turbine nozzles 8. Referring in particular to FIG. 2, with continuing reference to FIG. 1, a gap G1 is formed between the outer combustor liner portion 31.1 and the outer platforms 21 of the nozzle segments 17. A second gap G2 is formed between the inner combustor liner portion 31.2 and the inner platforms 23 of the nozzle segments 17.

An apparatus 43 for effecting a seal of the gap G1 is provided around the outer combustor liner portion 31.1; an apparatus 45 for effecting a seal of the gap G2 is provided around the inner combustor liner portion 31.2.

With reference to FIGS. 3, 4 and 5, with continuing reference to FIG. 2, in some embodiments, the apparatus 43 includes a sealing structure having a plurality of sealing members 47. Each sealing member 47 comprises a first edge portion 49 and a second edge portion 51. As best shown in FIG. 3, a plurality of sealing members 47 are arranged adjacent to one another around the rotation axis A-A. In FIG. 3 only two sealing members 47 are shown, but it shall be understood that a full annular configuration of said sealing members 47 are located around the rotation axis A-A. A laminar sealing element 48 can be arranged between pairs of adjacent sealing members 47.

The first edge portion 49 and the second edge portion 51 can be substantially parallel to one another. The edge portions 51 and 49 can be rectilinear. In other embodiments, the edge portions 49, 51, or at least one of them, can extend along a rectilinear axis but may have a crown-shaped outer surface, i.e. a crowning in the tangential direction. The first edge portion 49 of each sealing member 47 can have a substantially cylindrical outer surface 49.1, which forms a journal for pivotally connecting the sealing member 47 to the turbine nozzles 8 or to a component integrally connected thereto. In the embodiment shown in the attached drawings, each first edge portion 49 is housed in a slot 55 forming a pivoting seat for the sealing member 47. The slot 55 can be provided in the outer platform 21 of a respective nozzle segment 17. In some embodiments, as shown in FIG. 3, one sealing member 47 is hinged to each nozzle segment 17.

As a matter of fact, since the turbine nozzles 8 can be subjected to non-homothetic thermal deformations, in order to better cope with the thermal expansion of the slot housing the first edge portion 49, this latter may have a crowned cylindrical outer surface, i.e. a surface with a rectilinear axis but a variable cross-sectional dimension, with a smaller cross sectional area at the terminal ends and a larger cross sectional area in the central portion thereof.

Each sealing member 47 can be retained in the respective slot 55 by a pair of tongues 57, 59. A resilient member, for instance a spring 61, can be mounted on one of the tongues, e.g. on tongue 57. The resilient member 61 can be configured to bias the sealing member 47 in sealing contact against the aft end side of the combustor liner, as better explained later on.

To prevent or limit axial movement of the sealing member 47 along the slot 55, a retention pin 63 or another restraining member can be mounted on the other tongue 59, as best shown in the section of FIG. 5. The retention pin 63 engages an indentation 65 provided along the first edge portion 49 of the sealing member 47.

The first edge portion 49 has a substantially circular cross section, as best shown in FIG. 4, to co-act with slot 55 allowing the sealing member 47 to pivot around a pivoting axis parallel to the edge portion 49. The cylindrical surface 49.1 of the first edge portion 49 is in sealing contact along at least one sealing contact line with the slot 55, thus providing a sealing effect between the sealing member 47 and the outer platform 21 of each nozzle segment 17.

The second edge portion 51 has a cylindrical surface 51.1 adapted to be in sealing surface contact with an annular surface 67 of the outer combustor liner portion 31.1. The annular surface 67 is preferably planar, and is located on a plane orthogonal to the rotation axis A-A. The sealing member 47 is urged in sealing surface contact against the annular surface 67 by the resilient member 61 and/or by a pressure differential between the outer side of the combustor liner 31 and the inner side of the combustor liner 31 during operation of the gas turbine engine 1. The resilient member 61 ensures a sufficient contact pressure on the annular surface 67 in particular in those operating conditions when the pressure difference between the exterior of the combustor liner 31 and the combustion chamber 33 is limited.

In embodiments disclosed herein, each sealing member 47 is substantially rigid. As used herein, the term "substantially rigid" means that the sealing member does not deform under normal operating conditions, i.e. under the forces applied thereto by the resilient member 61 and/or by the surrounding structural components interacting with the sealing member.

The first and second edge portions 49, 51 remain therefore approximately straight and the line of contact between the sealing member 47 and the annular surface 67, as well as the line of contact between the sealing member 47 and the slot 55 remain approximately rectilinear under different operating conditions. Taking thermal expansion into consideration and providing edge portions 49 with a crowning, the line of contact between the outer surface 49.1 of the pivoting edge portion 49 and the respective slot 55 can extend along a chordal line.

When the gas turbine engine 1 is in operation, the annular surface 67 and the outer platform 21 of the nozzle segments 17 can move one with respect to the other in axial and/or radial direction. Sealing of the gap G1 is ensured by the contact of the cylindrical surface 51.1 with the annular surface 67. The contact between the cylindrical surface 51.1 and the annular, planar surface 67 is a so-called hertzian contact along a line, which provides a sealing effect between the area outside the combustor liner 31 and the inner volume of the combustor liner 31. The cylindrical surface 51.1 will slide and/or roll on planar surface 67 maintaining full contact therewith along the entire extension of the sealing member 47.

The apparatus 45 effecting a seal of the gap G2 can be similar, in structure and operation, to the apparatus 43. The apparatus 45 includes a sealing structure having a plurality of sealing members 77. Each sealing member 77 comprises a first edge portion 79 and a second edge portion 81. As best shown in FIG. 3, a plurality of sealing members 77 are arranged adjacent to one another around the rotation axis A-A. Each sealing member 77 is substantially similar to sealing members 47.

The first edge portion 79 and the second edge portion 81 can be substantially rectilinear. In some embodiments, especially the first edge portion 79 may be provided with a crowning, as described above in connection with the edge portions 49. The edge portions 79 and 81 can extend along parallel axes. The first edge portion 79 of each sealing member 77 can have an approximately cylindrical outer surface 79.1 with a crown, i.e. a cross section which is larger in the central part and smaller near the terminal ends of the edge portion 79. The outer surface 79.1 forms a journal for pivotally connecting the sealing member 77 to the turbine nozzles 8 or to a component integrally connected thereto. In the embodiment shown in the attached drawings, each first edge portion 79 is housed in a slot 85 forming a pivoting seat for the sealing member 77. The slot 85 can be provided in the inner platform 23 of a respective nozzle segment 17. In some embodiments, as already described for the sealing member 47, one sealing member 77 is hinged to each nozzle segment 17.

Each sealing member 77 can be retained in the respective slot 85 by a pair of tongues similar to tongues 57, 59. A resilient member, for instance a spring 91 can be mounted on one of the tongues and configured to bias the sealing member 77 in sealing contact against the aft end side of the combustor liner 31 as better explained later on. To prevent or limit axial movement of the sealing member 77 along the slot 85, a retention pin (not shown) or another restraining member can be provided, similarly to retention pin 63.

The first edge portion 79 of the sealing member 77 has a substantially circular cross section, as best shown in FIG. 3, to co-act with slot 85 allowing the sealing member 77 to pivot around a pivoting axis parallel to the edge portion 79.

The cylindrical surface 79.1 of the first edge portion 79 is in sealing contact along at least one sealing contact line with the slot 85, thus providing a sealing effect between the sealing member 77 and the inner platform 23 of each nozzle segment 17.

The second edge portion 81 has a cylindrical surface 81.1 adapted to be in sealing surface contact with an annular surface 97 of the inner combustor liner portion 31.2. The annular surface 97 is preferably planar, and is located on a plane orthogonal to the rotation axis A-A. The sealing member 77 is urged in sealing surface contact against the annular surface 97 by the resilient member 91 and/or by a pressure differential between the outer side of the combustor liner 31 and the inner side of the combustor liner 31 during operation of the gas turbine engine 1.

In embodiments disclosed herein, each sealing member 77 is substantially rigid, i.e. it does not deform under normal operating conditions. The first and second edge portions 79, 81 remain therefore approximately rectilinear, in that they extend along rectilinear axes, even though at least the edge portion 79 may have a crowned outer surface, as mentioned above in connection with edge portion 49. Thus the sealing member 77 and the annular surface 97, as well as the sealing member 77 and the slot 85 remain in contact along respective lines, under any operating condition. In case of crowned edge portions, the contact line can be a chordal contact line.

When the gas turbine engine 1 is in operation, the annular surface 97 and the inner platforms 23 of the nozzle segments 17 can move one with respect to the other in axial and/or radial direction. Sealing of the gap G2 is ensured by the contact of the cylindrical surface 81.1 with the annular surface 97, which is maintained without any deformation of the sealing member 77. The cylindrical surface 81.1 will slide and/or roll on planar surface 97 maintaining full contact therewith along the entire extension of the sealing member 77.

While the invention has been described in terms of various specific embodiments, it will be apparent to those of ordinary skill in the art that many modifications, changes, and omissions are possible without departing form the sprit and scope of the claims.

The invention claimed is:

1. An apparatus for sealing a gap between a first structural member and a second structural member in a turbomachine, said apparatus comprising:
   a sealing member having a body with a top, a bottom, a front, and a back, the body comprising a cross-section that is solid and non-uniform, the cross-section comprising a cylindrical cross-section at the bottom forming a first edge portion having a cylindrical outer surface, the cross-section comprising a smaller cross-sectional area at terminal ends and a larger cross-sectional area in a central portion thereof, the top comprising a second edge portion forming a curved contact surface at the front;
   a hinge connection for receiving the cylindrical cross-section to orient the body of the sealing member vertically when installed in the turbomachine, the hinge connection comprising a seat formed by the first structural member, the seat allowing the body to rotate relative to the first structural member;
   tongues affixed to the first structural member, the tongues located proximate the body of the sealing member to form part of the seat that surrounds the cylindrical cross-section; and
   a resilient member mounted to at least one of the tongues affixed to the first structural member, wherein the resilient member is configured to press on the back of the body to bias the curved contact surface on the front of the sealing member against a contact surface of the second structural member so that the curved contact surface is in sealing contact with the contact surface of the second structural member.

2. The apparatus of claim 1, wherein the contact surface of the second structural member is a planar contact surface.

3. The apparatus of claim 1, wherein the first edge portion comprises a first cylindrical surface having an axis parallel to the first edge portion.

4. The apparatus of claim 1, wherein the curved contact surface of the second edge portion comprises a second cylindrical surface having an axis parallel to the first edge portion.

5. The apparatus of claim 1, further comprising:
a restraining member configured to prevent or limit movement of the sealing member in the seat in a direction parallel to the first edge portion.

6. The apparatus of claim 1, wherein the sealing member is substantially rigid.

7. The apparatus of claim 1, further comprising:
a pin to prevent axial movement of at least one of the sealing members.

8. The apparatus of claim 1, further comprising:
a pin coupled with at least one of the tongues and engaged with the sealing members.

9. The apparatus of claim 1, further comprising:
a pin coupled with at least one of the tongues,
wherein the pin engages with at least one of the sealing members at an indentation in the body.

10. The apparatus of claim 1, further comprising:
a pin penetrating through at least one of the tongues,
wherein the pin engages with at least one of the sealing members.

11. A gas turbine comprising:
a casing;
a turbine stage disposed in the casing, the turbine stage comprising a set of static nozzles and a set of rotary blades;
a combustor and a combustor liner extending from a forward end to an aft end thereof; and
the apparatus of claim 1,
wherein the apparatus is configured to seal a gap between the combustor liner and the stationary nozzles.

12. The gas turbine of claim 11, wherein the combustor is an annular combustor, and wherein the combustor liner comprises an outer combustor liner portion and an inner combustor liner portion.

13. A sealing structure for sealing a gap between a combustor liner and a surrounding structure of a gas turbine engine, said sealing structure comprising:
a plurality of sealing members arranged in an annular configuration, each of the sealing member comprising a body with a top, a bottom, a front, and a back, the body comprising a cross-section that is solid and non-uniform, the cross-section comprising a cylindrical cross-section at the bottom forming a first edge portion having a cylindrical outer surface, the cross-section comprising a smaller cross-sectional area at terminal ends and a larger cross-sectional area in a central portion thereof, the top comprising a second edge portion a curved contact surface at the front;
a hinge connection for receiving the first edge portion, the hinge connection comprising a seat formed by the surrounding structure to orient the body of the sealing member vertically when installed in the gas turbine engine, the hinge connection comprising a seat formed by the first structural member, the seat allowing the body to rotate relative to the first structural member;
the seat allowing the body to rotate relative to the surrounding structure;
tongues affixed to the surrounding structure, the tongues located proximate the body of the sealing member to form part of the seat; and
a resilient member mounted to at least one of the tongues affixed to the surrounding structure,
wherein the resilient member is configured to press on the back of the body to bias the curved contact surface on the front of the sealing member against a contact surface of the combustor liner so that the curved contact surface is in sliding contact with the contact surface of the combustor liner.

14. The sealing structure of claim 13, wherein the contact surface of the combustor liner is planar.

15. The sealing structure of claim 13, wherein the surrounding structure comprises a set of stationary nozzles of a gas turbine stage fluidly coupled to the combustor liner.

16. The sealing structure of claim 13, further comprising:
a laminar sealing element arranged between each pair of adjacent sealing members.

17. The sealing structure of claim 13, further comprising:
a pin to prevent axial movement of at least one of the sealing members.

18. The sealing structure of claim 13, further comprising:
a pin coupled with at least one of the tongues and engaged with at least one of the sealing members.

19. The sealing structure of claim 13, further comprising:
a pin coupled with at least one of the tongues,
wherein the pin engages with at least one of the sealing members at an indentation in the body.

20. The sealing structure of claim 13, further comprising:
a pin penetrating through at least one of the tongues,
wherein the pin engages with at least one of the sealing members.

* * * * *